(12) United States Patent
Mittersteiner et al.

(10) Patent No.: US 7,341,284 B2
(45) Date of Patent: Mar. 11, 2008

(54) JOINT ASSEMBLY FOR FLEXIBLE AND SEMI-RIGID PIPINGS

(75) Inventors: Melchor Mittersteiner, Santiago (CL); Sergio Barrientos, Santiago (CL)

(73) Assignee: Tecnologia Hidraulica THC S.A., Santiago (CL)

( * ) Notice: Subject to any disclaimer, the term of this patent is extended or adjusted under 35 U.S.C. 154(b) by 216 days.

(21) Appl. No.: 11/127,091

(22) Filed: May 12, 2005

(65) Prior Publication Data

US 2005/0200122 A1 Sep. 15, 2005

Related U.S. Application Data

(62) Division of application No. 10/424,989, filed on Apr. 29, 2003, now Pat. No. 7,014,216.

(51) Int. Cl.
*F16L 33/00* (2006.01)

(52) U.S. Cl. .................. 285/247; 285/245; 285/256; 285/259

(58) Field of Classification Search ........... 285/239, 285/242, 245, 247, 256, 259; 29/508
See application file for complete search history.

(56) References Cited

U.S. PATENT DOCUMENTS

| | | | | |
|---|---|---|---|---|
| 646,590 | A | * | 4/1900 | Williams ............... 285/247 |
| 787,529 | A | * | 4/1905 | Muehlberg ............. 285/246 |
| 1,263,557 | A | | 4/1918 | Hilton |
| 1,326,250 | A | * | 12/1919 | Brown et al. .......... 285/246 |
| 1,446,489 | A | | 2/1923 | Vivarttas |
| 1,684,713 | A | | 9/1928 | Norgren |
| 1,980,389 | A | * | 11/1934 | Dennie ................. 285/246 |
| 2,002,472 | A | * | 5/1935 | Jensen ................. 285/327 |
| 2,120,275 | A | * | 6/1938 | Cowles ................ 285/222.4 |
| 2,166,448 | A | * | 7/1939 | Schuknecht et al. ..... 285/116 |
| 2,266,211 | A | | 12/1941 | Kaiser |
| 2,367,447 | A | * | 1/1945 | Strout ................. 285/247 |
| 2,853,320 | A | | 9/1958 | Liebelt et al. |
| 3,710,005 | A | * | 1/1973 | French ................. 174/89 |
| 4,124,234 | A | * | 11/1978 | Clark .................. 285/247 |
| 4,437,689 | A | * | 3/1984 | Goebel et al. ......... 285/246 |
| 4,500,118 | A | * | 2/1985 | Blenkush .............. 285/247 |
| 4,583,767 | A | | 4/1986 | Hansen |
| 4,736,969 | A | | 4/1988 | Fouts |

(Continued)

FOREIGN PATENT DOCUMENTS

GB 1 272 540 5/1972

(Continued)

*Primary Examiner*—James M. Hewitt
(74) *Attorney, Agent, or Firm*—Shlesinger, Arkwright & Garvey LLP

(57) ABSTRACT

A joint assembly for flexible and semi-rigid piping, such as high density polyethylene piping or the like. The assembly comprises a joint end sleeve and a nut. The joint end sleeve comprises in series first, second, third and fourth co-axial sections of circular cross-sections. The first and second sections are to be disposed within the end of the piping. The nut, with an internal threaded surface, is made of a material harder than the one used in the piping and with a higher or equal hardness than the one on the joint end sleeve. The nut is configured to press the end of the piping around the first and second sections.

15 Claims, 4 Drawing Sheets

U.S. PATENT DOCUMENTS

| | | |
|---|---|---|
| 4,805,942 A | 2/1989 | Goodridge |
| 4,817,997 A | 4/1989 | Ingram |
| 5,178,423 A | 1/1993 | Combeau |
| 5,860,678 A | 1/1999 | Urzua |
| 6,022,053 A * | 2/2000 | Hukuda ............... 285/331 |
| 6,209,804 B1 * | 4/2001 | Spriegel ............... 239/373 |
| 6,347,729 B1 * | 2/2002 | Spriegel ............... 222/529 |
| 6,557,788 B1 | 5/2003 | Huang |
| 6,971,390 B1 * | 12/2005 | Vasek et al. ............. 604/533 |
| 7,014,216 B2 * | 3/2006 | Mittersteiner et al. ...... 285/247 |
| 2004/0245776 A1 * | 12/2004 | Evans et al. ............. 285/259 |
| 2004/0251683 A1 * | 12/2004 | Fisher et al. ............. 285/256 |

FOREIGN PATENT DOCUMENTS

| | | |
|---|---|---|
| GB | 2112483 | 7/1983 |
| WO | WO 02/084158 A2 * | 10/2002 |

* cited by examiner

JOINT ASSEMBLY FOR FLEXIBLE AND SEMI-RIGID PIPINGS

RELATED APPLICATION

This application is a division of Application Ser. No. 10/424,989, filed Apr. 29, 2003, now U.S. Pat No. 7,014,216, incorporated herein by reference.

FIELD OF THE INVENTION

The present invention is related to a joint assembly for flexible and semi-rigid pipings, such as high-density polyethylene pipings or the like, wherein the system comprises a special nut and a joint end sleeve.

BACKGROUND OF THE INVENTION

The U.S. Pat. No. 5,178,423 of A. Combeau consists of a fast assembly for flexible pipings which, unlike the present invention, a butt does not take place between the nut (6) and the threaded element (5) of the patent, in such a way that the nut risks to be subjected to hazardous tensions if it is excessively tightened by the installer. Also, the lack of a butt on the nut may result in a variable tightening of the piping, which is subject at the installer's discretion and care, with the resulting risks of leakage in the event that the tightening gets loosened or taking the risk that nut be damaged as a consequence of an excessive tightening. On the contrary, the joint of the present invention has butting means for axial displacement, so that the nut cannot be tightened against the piping beyond a displacement predetermined by manufacturer.

The U.S. Pat. No. 5,860,678 ('678 patent) of M. Mittersteiner (the same inventor who is one of the co-inventors of the present invention) shows a self-threading joining. Unlike the present invention, in the '678 patent, it is not possible to get a joining in a quick way, because the nut threads must be continuous and extend themselves by more than one turn to be able to form the thread in the piping. On the contrary, in most of the embodiments of the present invention, the nut can have a discontinuous threading that is threaded with the joint end sleeve, with the purpose of achieving a full tightening in a fraction of a turn.

BRIEF DESCRIPTION OF THE DRAWINGS

To understand the invention better, it will be described on the basis of two preferred embodiments which are shown in the following figures, wherein.

DETAILED DESCRIPTION OF THE INVENTION

Figure 1A:
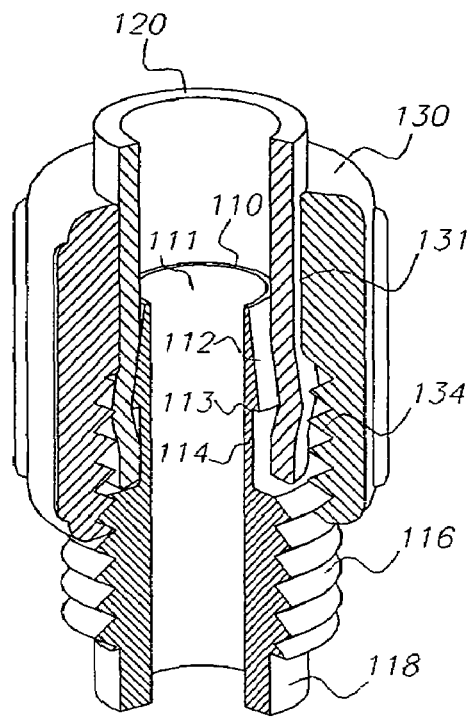
FIG. 1a shows a cross section view of the assembly for a first embodiment of the invention, in an initial situation of the piping installation in it.
Figure 1B:
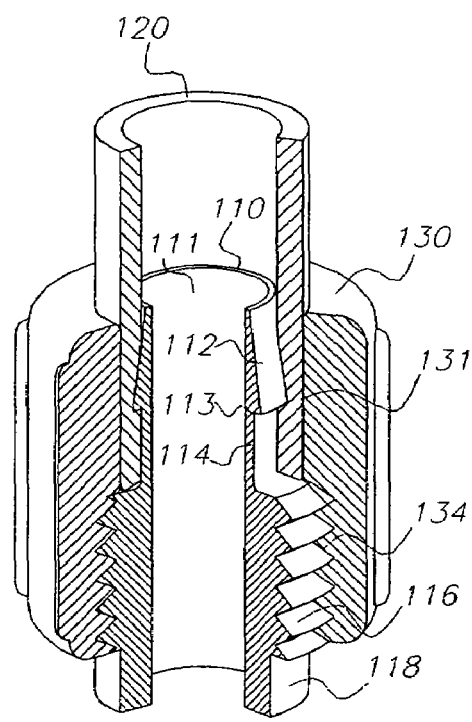
FIG. 1b shows the same first embodiment of FIG. 1a, with the piping already installed in it.

As shown in FIG. 1a and FIG. 1b, according to a first embodiment, the invention's joint end assembly comprises a joint end sleeve 110 and a special nut 130, made of a material harder than the material used in the piping 120, which aims to join said joint end sleeve 110, and with a hardness higher or equal to the last one.

The joint end sleeve 110 consists of four co-axial sections with circular cross sections, all of which are affected by a passing duct 111. A first section of the joint end sleeve 110 consists of a truncated-cone shaped end 112, being its narrower end external, whose outside diameter on said end is slightly smaller than the inside diameter of the piping 120. A first smooth cylindrical section 114 follows to the base with the biggest diameter at the conical end 112, with an outside diameter smaller than the outside diameter of said larger base of the conical end 112, being of a diameter preferably substantially equal to the outside diameter of the smaller end of said conical section 112. The first cylindrical section 114 is succeeded by a threaded cylindrical section 116, with such a diameter that the respective nut 130 allows to pass through the piping 120 in a way smoothly tightened. The other end of the joint end sleeve 110 finishes in a second smooth section 118, cylindrical, with a diameter that will depend on the application of the joint. A throat 113 is formed between the large diameter edge of the truncated-cone shaped section 112 and the top edge of the first cylindrical section 114.

The special nut 130 of the joint end assembly has two types of co-axial surfaces on its hollow: a smooth cylindrical top surface 131, larger and with a bigger diameter, preferably slightly larger than outside diameter of the piping 120; and a threaded cylindrical surface 134 with a smaller average diameter and an average diameter slightly larger than average diameter of the smooth cylindrical surface 131, being this thread supplementary to the thread of the threaded cylindrical section 116 of the joint end sleeve 110. These threads can be made up of a continuous (or standard) thread or of a segmented (or discontinued) thread as of a quick fastening type.

To carry out the joint between the piping 120 and the joint end assembly of the invention, the special nut 130 is inserted into the end of the flexible or semi-rigid piping 120, in such a way that the threaded surface 134 is oriented to the end of said piping. Then the flexible or semi-rigid piping end 120 is axially inserted by external end of truncated-cone shaped section 112 of joint end sleeve 110, until the end of said piping 120 contacts the annular top face of threaded cylindrical section 116 of said joint end sleeve 110. In this operation, the piping will be (elastically or plastically) deformed (depending on the manufacturing material) when the piping is inserted into the truncated-cone shaped section 112 and the flexible or semi-rigid piping end 120 will tend to contract itself to fit into the throat 113 of the first cylindrical section 114. Finally, the special nut 130 is axially slid in direction to the threaded cylindrical section 116 of said joint end sleeve 110 in order to thread it to this, until the annular cross-section surface of the nut, which is formed between the top area of the of threaded cylindrical surface 134 and the bottom area of the smooth cylindrical surface 131, contacts the annular top surface of threaded cylindrical section 116 of the joining end 110.

By starting the threading, the smooth surface 131 of the special nut 130 does not still exercise any radial pressure on the external face of the piping 120, because this smooth surface 131 is found over the widening produced on the piping by the truncated-cone shaped area of the joint end sleeve 110. As the threading of the special nut 130 moves axially forward into the threading of said sleeve 110, the smooth cylindrical surface 131 of said nut 130 starts to compress in radial direction to the piping 120, which suffers elastic and plastic deformation, and compresses itself against the surface of the joint end sleeve 110 and filling the space of its throat 113, so that the piping is firmly caught by radial compression between said sleeve 110 and said special nut 130.

Figure 2A:
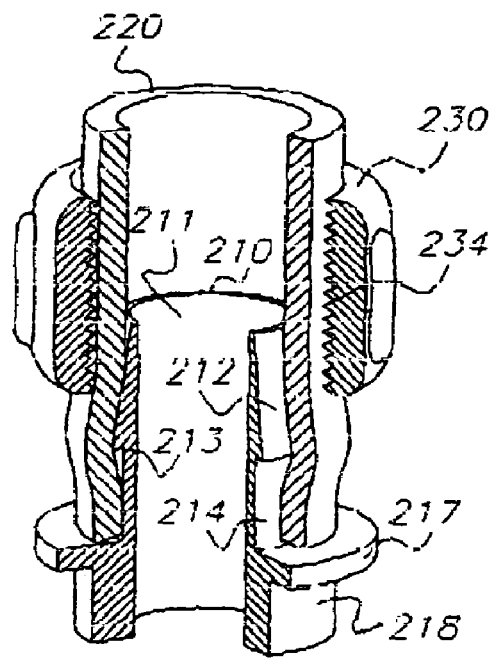
FIG. 2a shows a cross section view of the assembly for a second embodiment of the invention, in an initial situation of the piping installation in it.
Figure 2B:
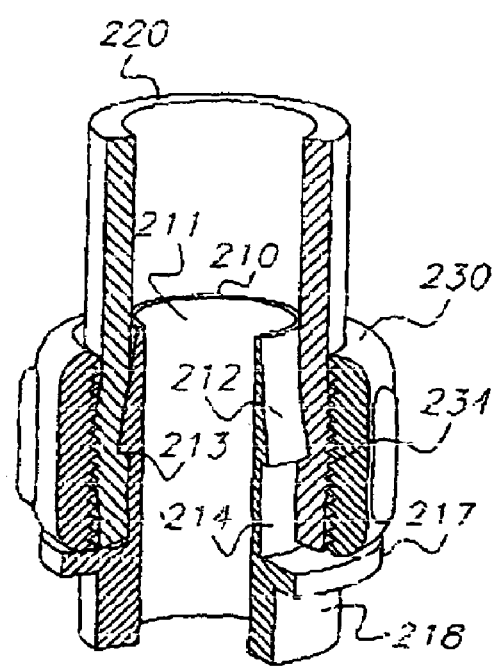
FIG. 2b shows the same second embodiment of FIG. 2a, with the piping already installed in it.

A second embodiment of the invention is shown in FIGS. 2a and 2b, wherein the joint end assembly of the invention comprises a joint end sleeve 210 and a nut 230, made of a material harder than the one used in piping 220, which is intended to be joined to said joint end sleeve 210, and with a hardness equal or higher than the last one.

The joint end sleeve 210 consists of four co-axial sections with circular section, all of which are affected by a passing duct 211. A first section of the joint end sleeve 210 consists of a truncated-cone shaped end 212, being its narrower end external and whose outside diameter in said end is slightly smaller than the inner diameter of the piping 220. The larger diameter base of the truncated-cone shaped end 212 is succeeded by a first smooth cylindrical section 214, with an outside diameter smaller than the outside diameter of said larger base of the truncated-cone shaped end 212, being a diameter rather substantially equal to the outside diameter of the smaller end of said truncated-cone section 212. The first cylindrical section 214 is succeeded by an intermediate-smooth cylindrical section 217 whose diameter is larger than the inside diameter of the nut 230. The other end of the joint end sleeve 210 ends in a second smooth section 218, preferably cylindrical, with a diameter which will depend on the joint application. A throat 213 is formed between the larger diameter edge of the truncated-cone section 212 and the top edge of the first cylindrical section 214.

The nut 230 of the joint end assembly has an internal threaded surface 234, which extends itself axially on the end, being the smaller diameter of the larger threading, preferably slightly larger than the diameter of the piping 220.

To carry out the union between piping 220 and joint end assembly of the invention, the nut 230 is inserted into an end of flexible or semi-rigid piping 220. Then, the end of flexible or semi-rigid piping 220 is axially inserted by the external end of the truncated-cone section 212 of the joint end sleeve 210 until the end of the piping 220 contacts the annular top face of the intermediate cylindrical section 217 of the joint end sleeve 210. The piping will be elastically and/or plastically deformed in this operation when the piping is inserted into a truncated-cone shaped section 212 and the flexible or semi-rigid piping end 220 will tend to contract itself to fit into the throat 213 of the first cylindrical section 214. Finally, the nut 230 is axially slid and rotated in direction to the intermediate cylindrical section 217 of said joint end sleeve 210.

By starting both the turn and axial displacement of the nut 230, the threaded surface 234 of said nut 230 does not exert any radial pressure on the external face of the piping 220 yet, because said surface 234 is over the widening produced on the piping by the truncated-cone area of the joint end sleeve 210. When the nut achieves the mentioned widening on the piping 220, the threaded nut 234 of said nut 230 starts to thread itself on the piping 220 by compressing itself radially; and it is elastically and plastically deformed to be compressed against the surface of the joint end sleeve 210 by filling space of the throat 213 of the sleeve 210 so that piping 220 is firmly caught between the sleeve 210 and the nut 230 by compression.

Figure 3A:
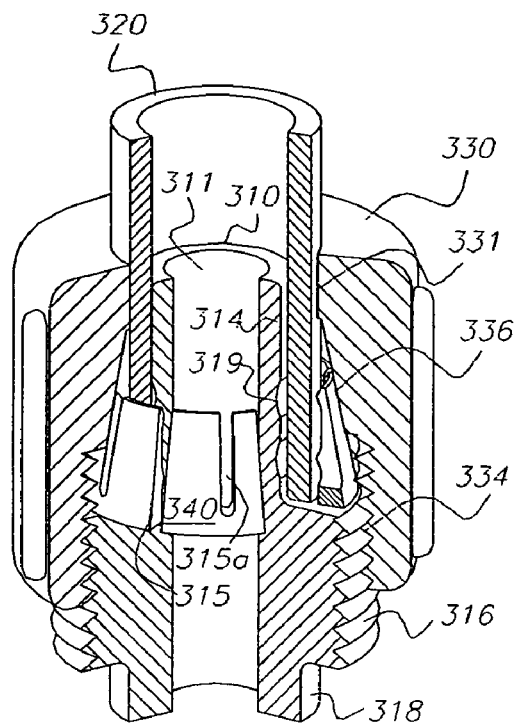
FIG. 3a shows a cross section view of the assembly for a third embodiment of the invention, in an initial situation of the piping installation in it.
Figure 3B:
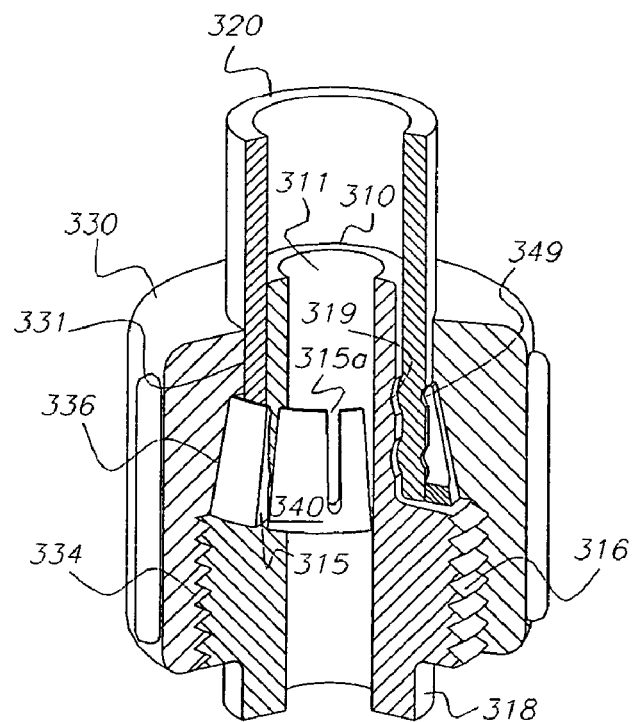
FIG. 3b shows the same third embodiment of FIG. 3a, with the piping already installed in it.

FIGS. 3a and 3b show a third embodiment of this invention, wherein the joint end assembly comprises a joint end sleeve 310, a flexible tightening ring 340 and a nut 330 made of a material harder than the material used for the piping 320 which is intended to join to said joint end sleeve 310, being said nut 330 with a larger or same hardness than said joint sleeve 310.

The joint end sleeve 310 is made up by three co-axial sections, with a circular section, which are affected by a passing duct 311. A first section 314 of the joint end sleeve 310 is cylindrical with an outside diameter slightly smaller than the inside diameter of the piping 320, having at least one annular groove 319 in its cylindrical mantle. The first cylindrical section 314 is succeeded by a threaded cylindrical section 316, with a diameter slightly larger than the outside diameter of the piping 320, so that it presents a top annular stop surface for said flexible ring 340 and for the nut 330. The other end of the joint end sleeve 310 ends in a third smooth cylindrical section 318, with a cross-section which will depend on the joint application.

The flexible tightening ring 340 has a truncate-cone shape and its inside mantle has at least one annular edge 349 which will be cooperative with said at least one groove 319 of said cylindrical section 314 of the joint end 310, so that the inside diameter of the annular edge 349 should be substantially equal to the outside diameter of the piping 320. Optionally, the flexible tightening ring 340 can have one or more longitudinal grooves 315a, made up by its perimetric wall. Preferably, the flexible tightening ring 340 has a longitudinal discontinuation 315, so that the body of the ring 340 results perimetrically discontinuous.

The nut 330 of the joint end assembly has three types of internal coaxial surfaces. A first internal surface 331 is extreme and consists of a cylindrical slot, with a diameter slightly larger than the outside diameter of the piping, so that this passes through smoothly. The first internal surface 331 is axially succeeded by an intermediate surface with a truncated-cone shaped mantle 336, with the smaller diameter end next to the mentioned first cylindrical surface 331, being this smaller diameter larger than the diameter of the surface 331 but smaller than the larger outside diameter of the flexible tightening ring 340. The larger diameter of said intermediate surface with a truncated-cone shaped mantle 336 is slightly larger than the smaller diameter of the external truncated-cone shaped surface of said flexible tightening ring 340, wherein the conicities of both truncated-cone shaped surfaces are identical, in order to produce a radial tightening force component larger than the axial tightening force component when this nut 330 advances. A third internal surface 334 is threaded and supplementary to the second cylindrical threaded section 316 of the joint end sleeve 310.

To carry out the joint between the piping 320 and the joint end assembly of the invention in this third embodiment, the nut 330 is inserted into the piping end 320, with a threaded end oriented to the end of the mentioned piping 320. Then, the flexible tightening ring 340 is axially inserted into the piping 320, with its larger diameter end oriented to the end of the mentioned piping 320 in order to insert the piping end 320 through the external end of the first cylindrical section 314 on the joint end sleeve 310, until the end of the piping 320 contacts the annular top surface of the second cylindrical threaded section 316 of the mentioned joint end sleeve 310. Then, it is axially slid and by turning the nut 330 in direction to the second cylindrical threaded section 316 of said joint end sleeve 310, until the top edge of the flexible tightening ring 340 contacts the annular top edge of intermediate surface of the truncated-cone shaped mantle of the nut 330.

At the start of the axial displacement and the turning of the nut 330, the intermediate surface of the truncated-cone shaped mantle 336 of said nut 330 starts to compress the flexible tightening ring 340, which in turn compresses the piping 320 in radial direction, with at least one annular edge 349, so that the mentioned piping 320 is radially deformed by filling the annular groove(s) 319 of said first section 314 on the joint end sleeve 310 so that the piping 320 gets firmly caught among said sleeve 310, said flexible tightening ring 340 and said nut 330 by radial compression. In case of existing one or more perimetrical grooves 315a or a longitudinal discontinuance 315 in said flexible tightening ring 340, these grooves or this discontinuance will cooperate with the deformation of said ring 340 so that it fits to the piping 320 with less effort.

Because of the nature of the third embodiment of the invention, unlike other embodiments of this invention, the joint can be applied in rigid type pipings, besides the flexible and semi-rigid pipings. A rigid piping type on which the third embodiment of the invention can be applied is that one of annealing copper, not being this case restrictive.

Figure 4A:
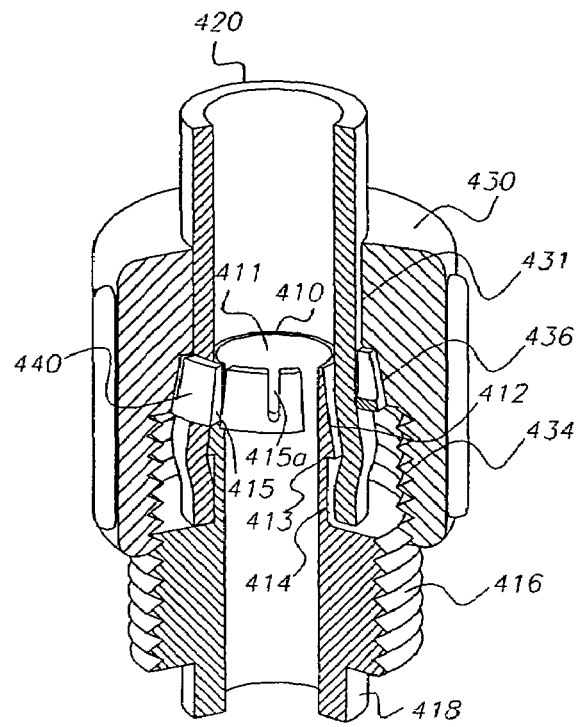
FIG. 4a shows a cross section view of the assembly for a fourth embodiment of the invention in an initial situation of the piping installation in it.
Figure 4B:
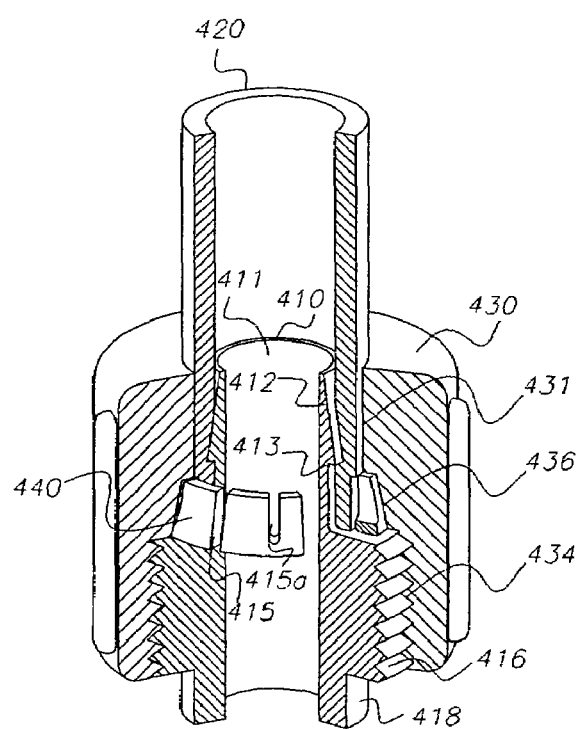
FIG. 4b shows the same fourth embodiment of FIG. 4a, with the piping already installed in it.

A fourth embodiment of this invention is shown in FIG. 4a and FIG. 4b, wherein the invention joint end assembly comprises a joint end sleeve 410, a tightening ring 440 and a nut 430, which is made of a material harder than the one used in the piping 420 intended to connect to this joint end sleeve 410 and with a hardness equal or higher than this one.

The joint end sleeve 410 consists of four co-axial sections with circular cross sections, and each of these sections is affected by a passing duct 411. A first section of the joint end sleeve 410 consists of a truncated-cone shaped end 412, and its external end is the narrowest end whose outside diameter in that end is slightly smaller than the inside diameter of the piping 420. The larger diameter base of the truncated-cone shaped end 412 is succeeded by a first smooth cylindrical section 414, with an outside diameter smaller than the outside diameter of the mentioned larger base of the truncated-cone shaped end 412, being of a diameter substantially equal to the outside diameter of the smaller end of said truncated-cone shaped section 412. The first cylindrical section 414 is succeeded by a second threaded cylindrical section 416, with a diameter slightly larger than outside diameter of the piping 420, in such a way that it shows a top annular stop surface for the mentioned piping. The other end of the joint end sleeve 410 finishes in a second smooth section 418, preferably cylindrical, whose diameter will depend on the joint application. A throat 413 is formed between the larger diameter edge of truncated-cone shaped section 412 and the top edge of the first cylindrical section 414.

The tightening ring 440 has an external truncated-cone shaped surface and an internal cylindrical surface, with a diameter slightly larger than the piping diameter 420. Optionally, the tightening ring 440 can have one or more longitudinal grooves 415a, on the perimetrical wall. Preferably, the tightening ring 440 has a longitudinal discontinuance 415 so that the body of this ring 440 results perimetrically discontinuous.

The nut 430 of the joint end assembly has three types of internal and co axial surfaces. A first internal surface 431 is terminal and consists of a cylindrical opening with a diameter slightly larger than the outside diameter of the piping, so that this one passes trough smoothly. An intermediate surface of the truncated-cone shaped mantle 436 whose conicity is substantially identical to the conicity of said tightening ring 440; being the smaller diameter end close to said cylindrical surface 431, but smaller than the outside larger diameter end of the tightening ring 440. The larger diameter of said intermediate surface of truncated-cone shaped mantle 436 is slightly larger than the smaller diameter of the external truncated-cone shaped surface of said tightening ring 440, wherein the conicities of both truncated-cone shaped surfaces are identical, in order to produce a radial tightening force component larger than the axial tightening force component when this nut 430 advances. A third internal surface 434 of the nut is threaded, which is supplementary to a second cylindrical threaded section 416 of the joint end sleeve 410.

To carry out the joint between the piping 420 and joint end assembly of the invention of this fourth embodiment, the nut 430 is inserted into the piping end 420, with a threaded end oriented to the end of said piping 420. Then the tightening ring 440 is axially inserted into said piping 420, with its larger diameter end oriented to the end of said piping 420, so that the end of said piping 420 be inserted afterwards by the end of the first cylindrical section 414 on the joint end sleeve 410, until the end of the piping 420 contacts the annular top surface of the second cylindrical threaded section 416 of said joint end sleeve 410. Then it is axially slid and the nut 430 is turned in direction to the second cylindrical threaded section 416 of said joint end sleeve 410, until the top edge of the tightening ring 440 contacts the annular top edge of the intermediate surface of the truncated-cone shaped mantle 436 of the nut 430.

By starting to move axially and turn the nut 430, the intermediate surface of the truncated-cone shaped mantle 436 of said nut 430 starts to compress the tightening ring 440, which in turn radially compresses the piping 420, so that the piping 420 gets radially deformed, filling the throat 413 of the joint end sleeve 410 in such a way that the piping 420 gets firmly caught by radial compression between said sleeve 410, the tightening ring 440, and the nut 430. Additionally, when the nut 430 is almost completely threaded in the threaded cylindrical section 416 of that joint end sleeve 410, the cylindrical surface 461 compresses also the piping 420 against the throat 413, thereby increasing the tightening of the joint assembly.

What is claimed is:

1. A joint assembly for flexible and semi-rigid piping, comprising:
    a) a joint end sleeve comprising first, second and third co-axial sections of circular cross-sections and a fourth section for connection to a piping system, said joint end sleeve including a passing duct;
    b) said first section including a truncated-cone shaped end having a narrower external end of an outside diameter slightly smaller than the inside diameter of the piping;
    c) said second section being axially adjacent to a larger diameter base of said truncated-cone shaped end, said second section including a cylindrical section with an outside diameter smaller than the outside diameter of said larger diameter base, resulting in the rise of a throat between said larger diameter base and said cylindrical section;

d) said third section being axially adjacent to said cylindrical section, said third section including a threaded section, said third section forming an annular radial surface next to said cylindrical section; and e) a nut made of a material harder than one used in the piping and with a higher or equal hardness than one used in said joint end sleeve, said nut having an internal threaded surface complementary to said threaded section, said nut including an internal cylindrical surface of a diameter slightly larger than the outside diameter of the piping, said internal threaded surface having an average diameter slightly larger than the diameter of said internal cylindrical surface, said nut including an annular radial surface formed between said internal threaded surface and said internal cylindrical surface, said internal cylindrical surface for compressing the piping when said joint end sleeve is inserted into the piping and said nut is tightened until said annular radial surface of said nut contacts said annular radial surface of said third section.

2. The joint assembly as in claim 1, and further comprising:

a) a tightening ring having an external truncated-cone shaped surface and an internal cylindrical surface, with an internal diameter slightly larger than the outside diameter of the piping; and b) said nut including an internal truncated-cone shaped surface between said internal cylindrical surface and said internal threaded surface, said internal truncated-cone shaped surface having a conicity substantially similar to the conicity of said tightening ring, wherein a smaller diameter end of said internal truncated-cone shaped surface is adjacent to said internal cylindrical surface, said smaller diameter end of said internal truncated-cone shaped surface having a size larger than the diameter of said cylindrical surface of said nut, and said internal truncated-cone shaped surface having a larger diameter end of a size slightly larger than said smaller outside diameter of said tightening ring.

3. The joint assembly as in claim 2, wherein said tightening ring has a perimetrical wall and at least one longitudinal groove in its perimetrical wall.

4. The joint assembly as in claim 2, wherein said tightening ring has a longitudinal discontinuance in such a way that the body of said ring is perimetrically discontinuous.

5. The joint assembly as in claim 1, wherein said internal threaded surface of said nut and said threaded section of said joint end sleeve include a continuous or standard threading.

6. The joint assembly as in claim 1, wherein said internal threaded surface of said nut and said threaded section of said joint end sleeve have a segmented or discontinuous thread.

7. A joint assembly as in claim 1, wherein said third section is circular in cross-section.

8. A joint assembly as in claim 1, wherein said fourth section is cylindrical.

9. A joint assembly for flexible and semi-rigid piping, comprising.

a) a joint end sleeve comprising first, second and third co-axial sections of circular cross-sections and a fourth section for connection to a piping system, said joint end sleeve including a passing duct;

b) said first section including a truncated-cone shaped end having a narrower external end of an outside diameter slightly smaller than the inside diameter of the piping;

c) said second section being axially adjacent to a larger diameter base of said truncated-cone shaped end, said second section including a cylindrical section with an outside diameter smaller than the outside diameter of said larger diameter base, resulting in the rise of a throat between said larger diameter base and said cylindrical section;

d) said third section being axially adjacent to said cylindrical section, said third section including a threaded section;

e) a nut made of a material harder than one used in the piping and with a higher or equal hardness than one used in said joint end sleeve, said nut having an internal threaded surface complementary to said threaded section, said nut including an internal cylindrical surface of a diameter slightly larger than the outside diameter of the piping, said internal threaded surface having an average diameter slightly larger than the diameter of said internal cylindrical surface, said internal cylindrical surface for compressing the piping when said joint end sleeve is inserted into the piping;

f) a tightening ring having an external truncated-cone shaped surface and an internal cylindrical surface, with an internal diameter slightly larger than the outside diameter of the piping; and g) said nut including an internal truncated-cone shaped surface between said internal cylindrical surface and said internal threaded surface, said internal truncated-cone shaped surface having a conicity substantially similar to the conicity of said tightening ring, wherein a smaller diameter end of said internal truncated-cone shaped surface is adjacent to said internal cylindrical surface, said smaller diameter end of said internal truncated-cone shaped surface having a size larger than the diameter of said cylindrical surface of said nut, and said internal truncated-cone shaped surface having a larger diameter end of a size slightly larger than said smaller outside diameter of said tightening ring.

10. The joint assembly as in claim 9, wherein said tightening ring has a perimetrical wall and at least one longitudinal groove in its perimetrical wall.

11. The joint assembly as in claim 9, wherein said tightening ring has a longitudinal discontinuance in such a way that the body of said ring is perimetrically discontinuous.

12. The joint assembly as in claim 9, wherein said internal threaded surface of said nut and said threaded section of said joint end sleeve include a continuous or standard threading.

13. The joint assembly as in claim 9, wherein said internal threaded surface of said nut and said threaded section of said joint end sleeve have a segmented or discontinuous thread.

14. A joint assembly as in claim 9, wherein said third section is circular in cross-section.

15. A joint assembly as in claim 9, wherein said fourth section is cylindrical.

* * * * *